(12) United States Patent
Liu et al.

(10) Patent No.: US 11,303,393 B2
(45) Date of Patent: Apr. 12, 2022

(54) DOWNLINK HYBRID AUTOMATIC REPEAT REQUEST FEEDBACK METHOD BASED ON DYNAMIC FRAME STRUCTURE, DEVICE AND TERMINAL

(71) Applicant: YULONG COMPUTER TELECOMMUNICATION SCIENTIFIC (SHENZHEN) CO., LTD., Shenzhen (CN)

(72) Inventors: Shi-Xiao Liu, Shenzhen (CN); Yan-Tao Zhong, Shenzhen (CN); Xiong-Wei Guo, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 232 days.

(21) Appl. No.: 16/321,928

(22) PCT Filed: Sep. 28, 2016

(86) PCT No.: PCT/CN2016/100624
§ 371 (c)(1),
(2) Date: Jan. 30, 2019

(87) PCT Pub. No.: WO2018/032582
PCT Pub. Date: Feb. 22, 2018

(65) Prior Publication Data
US 2019/0173624 A1    Jun. 6, 2019

(30) Foreign Application Priority Data
Aug. 16, 2016 (CN) .......................... 201610676304.9

(51) Int. Cl.
*H04L 1/18*        (2006.01)
*H04L 5/00*        (2006.01)
(Continued)

(52) U.S. Cl.
CPC .............. *H04L 1/1819* (2013.01); *H04L 1/18* (2013.01); *H04L 5/0055* (2013.01);
(Continued)

(58) Field of Classification Search
CPC ....... H04L 1/18; H04L 1/1819; H04L 1/1854; H04L 1/1893; H04L 5/0007;
(Continued)

(56) References Cited

U.S. PATENT DOCUMENTS

2015/0036559 A1* 2/2015 Zhang .................. H04L 1/1864
370/280
2017/0339676 A1* 11/2017 Belghoul ............ H04W 72/042

FOREIGN PATENT DOCUMENTS

CN        103249153 A     8/2013
CN        103297205 A     9/2013
(Continued)

*Primary Examiner* — Omer S Mian
*Assistant Examiner* — Bao G Nguyen
(74) *Attorney, Agent, or Firm* — ScienBiziP, P.C.

(57) ABSTRACT

A downlink Hybrid Automatic Repeat Request (HARQ) feedback method is provided, and includes: determining whether a currently used frame structure needs to be reconfigured; determining an uplink subframe for implementing a downlink HARQ feedback corresponds to each downlink subframe according to the currently used frame structure, when no reconfiguration is needed; determining an uplink subframe for implementing the downlink HARQ feedback corresponds to each downlink subframe in a last radio frame before the reconfiguration time point, when the reconfiguration is needed, according to a first frame structure used before a reconfiguration time point and a second frame structure to be used; determining an uplink subframe for implementing the downlink HARQ feedback corresponds to each downlink subframe in a last radio frame before the reconfiguration time point; when receiving downlink data
(Continued)

sent by a base station on any downlink subframe, sending a HARQ feedback message for the downlink data.

9 Claims, 11 Drawing Sheets

(51) Int. Cl.
  *H04W 16/14* (2009.01)
  *H04W 72/04* (2009.01)
(52) U.S. Cl.
  CPC ....... *H04W 16/14* (2013.01); *H04W 72/0446* (2013.01); *H04W 72/0453* (2013.01)
(58) Field of Classification Search
  CPC ... H04L 5/0055; H04L 5/0096; H04L 5/1469; H04W 16/14; H04W 72/0446; H04W 72/0453
  See application file for complete search history.

(56) References Cited

FOREIGN PATENT DOCUMENTS

| | | | |
|---|---|---|---|
| CN | 104936189 A | 9/2015 | |
| CN | 105024790 A | 11/2015 | |

\* cited by examiner

| Downlink HARQ feedback device based on the dynamic frame structure in an unlicensed frequency band 900 |
|---|
| Terminal 1000 |

FIG. 10

DOWNLINK HYBRID AUTOMATIC REPEAT REQUEST FEEDBACK METHOD BASED ON DYNAMIC FRAME STRUCTURE, DEVICE AND TERMINAL

This application claims priority of Chinese Patent Application No. 201610676304.9, entitled "DOWNLINK HYBRID AUTOMATIC REPEAT REQUEST FEEDBACK METHOD BASED ON DYNAMIC FRAME STRUCTURE, DEVICE AND TERMINAL," filed on Aug. 16, 2016 in the China National Intellectual Property Administration (CNIPA), the entire contents of which are incorporated by reference herein.

FIELD

The embodiments of the present disclosure relates to a technical field of communication, specifically a downlink Hybrid Automatic Repeat Request (HARQ) feedback method based on dynamic frame structure in an unlicensed frequency band, a downlink HARQ feedback device based on the dynamic frame structure in the unlicensed frequency band, and a terminal.

BACKGROUND

With rapid increase of communication traffic, Third Generation Partnership Project (3GPP) licensed spectrum appears to be increasingly insufficient to provide higher network capacity. In order to further improve utilization of frequency spectrum resources, the 3GPP provides a concept of Long Term Evolution (LTE) Assisted Access (LAA), which is uses an unlicensed frequency spectrum with help of an LTE licensed frequency spectrum. In order to make a LTE system coexist harmoniously with different systems such as Wi-Fi™ in an unlicensed frequency band, the 3GPP provides a mechanism of Listening Before Talk (LBT) to ensure fairness of the frequency spectrum resources used by different systems in the unlicensed frequency band by competing for channel usage rights. Working mode of the LTE system on an unlicensed frequency spectrum can be a Time Division Duplexing (TDD) mode, a Supplemental Downlink (SDL) mode or a dynamic uplink-downlink mode.

A physical layer frame structure of a Time Division Long Term Evolution (TD-LTE) is 10 ms, which includes two half-frame of 5 ms, uplink and downlink subframes configurations are shown in Table 1.

TABLE 1

| Uplink and downlink subframe configuration | Uplink and downlink conversion cycle | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in table 1, for a TDD structure of 5 ms downlink to uplink conversion cycle, one frame includes 8 normal subframes and 2 special subframes, and the table 1 can be referred to determine whether the 8 normal subframes are used for uplink or downlink. For a TDD structure of 10 ms downlink to uplink conversion cycle, one frame includes 9 normal subframes and 1 special subframe, and the table 1 can be referred to determine whether the 9 normal subframes are used for uplink or downlink, and each normal subframe includes 14 symbols.

A Hybrid Automatic Repeat Request (HARQ) mechanism is an important part of the LTE system to ensure transmission reliability, and a timing sequence of HARQ processes in different subframe configurations ensures efficient utilization of time-frequency resources. A traditional downlink HARQ timing sequence is asynchronous HARQ, that is, a receiver does not know transmission time in advance, thus, in the asynchronous HARQ, a signal is needed to indicate a current transmission HARQ process number. The asynchronous HARQ does not consider a timing sequence problem of a first transmission and a retransmission, thus a protocol only defines a timing sequence relationship of ACK/NACK feedback through a Physical Uplink Control Channel (PUCCH) from sending downlink data to a terminal, as shown in table 2.

TABLE 2

| Configuration number | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | 7 | 6 | | | 4 | 7 | 6 | | | 4 |
| 2 | 7 | 6 | | 4 | 8 | 7 | 6 | | 4 | 8 |
| 3 | 4 | 11 | | | | 7 | 6 | 6 | 5 | 5 |
| 4 | 12 | 11 | | | 8 | 7 | 7 | 6 | 5 | 4 |
| 5 | 12 | 11 | | 9 | 8 | 7 | 6 | 5 | 4 | 13 |
| 6 | 7 | 7 | | | | 7 | 7 | | | 5 |

As shown in table 2, a number k in the table represents that when the downlink data is transmitted on a subframe n, its corresponding ACK/NACK information will be fed back on a subframe n+k. When n+k>9, this means that ACK/NACK information (% is a residual symbol) should be fed back on the subframe with subframe number (n+k) % 10 of a first radio frame after a current radio frame. When n+k>19, ACK/NACK information is fed back on a subframe with subframe number (n+k) %10 of a second radio frame after the current radio frame.

With a development of Internet technology, communication traffic will increase rapidly, and service types will become more changeable. In an environment of an LAA micro-cell, due to a small number of users in the cell and with a development of data services, uplink and downlink services have characteristics of suddenness, that is, it is difficult to maintain a stable service ratio between the uplink and downlink services. In this case, a mode for TD-LTE statically configuring subframes cannot well adapt to sudden changes brought by such services, thereby resulting in a waste of resources and decline of frequency spectrum efficiency.

Therefore, in order to better solve a problem brought about by sudden changes of the services, a flexible and adaptive uplink and downlink subframe configuration mode between cells is needed, for example, a fully dynamic TDD configuration can be adopted. The fully dynamic TDD configuration is to dynamically determine the subframe configuration in a period in the future according to a proportion of current uplink and downlink services volume of the cell. However, in the fully dynamic TDD, there is no perfect timing sequence of a downlink HARQ feedback to ensure a stable and orderly transmission of the downlink data.

SUMMARY

Accordingly, according to a first aspect of the present disclosure, a downlink HARQ feedback method in an unlicensed frequency band based on a dynamic frame structure is provided. Each frame structure adopted in the unlicensed frequency band includes uplink subframes and downlink subframes, and each frame structure has one subframe continuity setting in a same type. The downlink HARQ feedback method includes: determining whether a currently used frame structure in the unlicensed frequency band needs to be reconfigured; when the currently used frame structure does not need to be reconfigured, determining an uplink subframe for implementing a downlink HARQ feedback corresponds to each downlink subframe according to the currently used frame structure; when the currently used frame structure needs to be reconfigured, according to a first frame structure used before a reconfiguration time point and a second frame structure to be used, determining an uplink subframe for implementing the downlink HARQ feedback corresponds to each downlink subframe in a last radio frame before the reconfiguration time point; when receiving downlink data sent by a base station on any downlink subframe, sending an HARQ feedback message for the downlink data on the uplink subframe corresponds to the any downlink subframe for implementing the downlink HARQ feedback.

In the technical solution, because each frame structure adopted in the unlicensed frequency band includes the uplink subframes and the downlink subframes, a special subframe converted from the downlink to the uplink is discarded, thus time-frequency resources can be fully utilized. Due to a channel detection is required when working in the unlicensed frequency band, therefore, by setting subframe continuity of the same type included in each frame structure, that is, by setting continuities of the uplink subframes and the downlink subframes in each frame structure respectively, channel occupation time can be maximized after occupying channel resources each time, thus instantaneous throughput can be maximized.

Frame structures meeting the above-described conditions have following types: UDDDDDDDDD, UUDDDDDDDD, UUUDDDDDDD, UUUUDDDDDD, UUUUUDDDDD, UUUUUUDDDD, UUUUUUUDDD, UUUUUUUUDD, UUUUUUUUUD.

As the present disclosure adopts dynamic frame structure in the unlicensed frequency band, that is, when it is not necessary to reconfigure the frame structure, the uplink subframe for implementing the downlink HARQ feedback corresponds to each downlink subframe is directly determined according to a current frame structure. When it is necessary to reconfigure the frame structure, as the frame structure used before and after a reconfiguration time point may be changed, when determining a timing sequence of the downlink HARQ feedback on a last radio frame before the reconfiguration time point, the frame structure used before and after the reconfiguration time point needs to be considered. Obviously, in the technical solution of the present disclosure, in a case that the reconfiguration of the frame structure in the unlicensed frequency band is required or is not required, the solutions of determining the uplink subframe for implementing the downlink HARQ feedback corresponds to the downlink subframes are provided respectively. The technical solution of the present disclosure provides the perfect downlink HARQ feedback method in the unlicensed frequency band to ensure a stable and orderly transmission of downlink data for a scene of working with a dynamic frame structure.

In the above technical solution, optionally, the step of determining an uplink subframe for implementing a downlink HARQ feedback corresponds to each downlink subframe according to the currently used frame structure, specifically includes: determining the uplink subframe for implementing the downlink HARQ feedback corresponds to each downlink subframe according to the timing sequence of the downlink HARQ feedback corresponds to the currently used frame structure.

In the technical solution, in view of a plurality of types of frame structure provided in the present disclosure, different timing sequences of the downlink HARQ feedback can be defined respectively. Therefore, when it is not necessary to reconfigure the frame structure, the uplink subframe for implementing the downlink HARQ feedback corresponds to each downlink subframe can be determined according to the timing sequence of the downlink HARQ feedback corresponds to the currently used frame structure.

In any of the above technical solutions, optionally, the step of according to the first frame structure used before the reconfiguration time point and the second frame structure to be used, determining the uplink subframe for implementing the downlink HARQ feedback corresponds to each downlink subframe in the last radio frame before the reconfiguration time point, specifically includes: determining the uplink subframe for implementing the downlink HARQ feedback corresponds to each downlink subframe in the last radio frame before the reconfiguration time point, according to the number of the uplink subframes in the first frame structure and in the second frame structure.

In the technical solution, when it is necessary to reconfigure, the frame structure used before and after the reconfiguration time point may be changed, that is, the number of the downlink subframe and the uplink subframe in the frame structure may be changed, therefore, to ensure stability and order of the timing sequence of the downlink HARQ feedback, and to avoid a problem of conflicts of the timing sequence of the downlink HARQ feedback, the uplink subframe for implementing the downlink HARQ feedback corresponds to each downlink subframe in the last radio frame before the reconfiguration time point is needed to be determined, according to the number of the uplink subframe used in the frame structure before and after the reconfiguration time point.

In the above technical solution, optionally, when the number of the uplink subframe in the first frame structure is less than or equal to the number of the uplink subframe in the second frame structure, determining the uplink subframe for implementing the downlink HARQ feedback corresponds to each downlink subframe in the last radio frame before the reconfiguration time point, according to the timing sequence of the downlink HARQ feedback corresponds to the first frame structure. When the number of the uplink subframe in the first frame structure is more than the number of the uplink subframe in the second frame structure, determining the uplink subframe for implementing the downlink HARQ feedback corresponds to each downlink subframe in the last radio frame before the reconfiguration time point, according to the timing sequence of the downlink HARQ feedback corresponds to the second frame structure.

In the technical solution, when the number of the uplink subframe used in the first frame structure is less than or equal to the number of the uplink subframe to be used in the second frame structure before the reconfiguration time point, the timing sequence of the downlink HARQ feedback of the last radio frame before the reconfiguration time point can still use the downlink HARQ feedback corresponds to the first frame structure, so as to ensure that each downlink subframe has a corresponding uplink subframe for implementing the downlink HARQ feedback in the last radio frame before the reconfiguration time point. When the number of the uplink subframe used in the first frame structure is more than the number of the uplink subframe to be used in the second frame structure before the reconfiguration time point, to ensure that each downlink subframe has the corresponding uplink subframes for implementing the downlink HARQ feedback in the last radio frame before the reconfiguration time point, the uplink subframes for implementing the downlink HARQ feedback in the last radio frame before the reconfiguration time point can be determined according to the timing sequence of the downlink HARQ feedback corresponds to the second frame structure used after the reconfiguration time point.

In any of the above technical solutions, optionally, subframe interval between each downlink subframe and the corresponding uplink subframe for implementing the downlink HARQ feedback is more than or equal to 3.

In the technical solution, as information transmission time and calculation processing time of the terminal together need at least 3 ms, the subframe interval between each downlink subframe and the corresponding uplink subframe for implementing the downlink HARQ feedback is more than or equal to 3. For example, a subframe n is a downlink subframe, a closest uplink subframe for implementing the downlink HARQ feedback corresponds to the subframe n should be n+4 (3 subframes are separated from the subframe n).

In any of the above technical solutions, optionally, when frame structure used in the unlicensed frequency band includes a plurality of uplink subframes, a number of downlink HARQ feedback messages sent on the plurality of uplink subframes is equalized.

In the technical solution, by equalizing the number of downlink HARQ feedback messages sent on the plurality of uplink subframes, a problem of excessive HARQ signaling overhead on a certain uplink subframe can be avoided.

According to a second aspect of the present disclosure, a downlink HARQ feedback device in an unlicensed frequency band based on a dynamic frame structure is further provided. Each frame structure adopted in the unlicensed frequency band includes uplink subframes and downlink subframes, and each frame structure has one subframe continuity setting in a same type. The downlink HARQ feedback device includes: a determination unit configured to determine whether a currently used frame structure in the unlicensed frequency band needs to be reconfigured; a first determination unit configured to determine an uplink subframe for implementing a downlink HARQ feedback corresponds to each downlink subframe according to the currently used frame structure, when the currently used frame structure does not need to be reconfigured; a second determination unit configured to determine an uplink subframe for implementing the downlink HARQ feedback corresponds to each downlink subframe in a last radio frame before a reconfiguration time point, according to a first frame structure used before the reconfiguration time point and a second frame structure to be used, when the currently used frame structure needs to be reconfigured; a sending unit configured to send an HARQ feedback message for the downlink data on the uplink subframe corresponds to the any downlink subframe for implementing the downlink HARQ feedback, when receiving downlink data sent by a base station on any downlink subframe.

In the technical solution, because each frame structure adopted in the unlicensed frequency band includes the uplink subframes and the downlink subframes, a special subframe converted from the downlink to the uplink is discarded, thus time-frequency resources can be fully utilized. Due to a channel detection is required when working in the unlicensed frequency band, therefore, by setting subframe continuity of the same type included in each frame structure, that is, by setting continuities of the uplink subframes and the downlink subframes in each frame structure respectively, channel occupation time can be maximized each time after occupying channel resources, thus instantaneous throughput can be maximized.

Frame structures meeting the above-described conditions have following types: UDDDDDDDDD, UUDDDDDDDD, UUUDDDDDDD, UUUUDDDDDD, UUUUUDDDDD, UUUUUUDDDD, UUUUUUUDDD, UUUUUUUUDD, UUUUUUUUUD.

As the present disclosure adopts dynamic frame structure in the unlicensed frequency band, that is, when it is not necessary to reconfigure the frame structure, the uplink subframe for implementing the downlink HARQ feedback corresponds to each downlink subframe is directly determined according to a current frame structure. When it is necessary to reconfigure the frame structure, as the frame structure used before and after a reconfiguration time point may be changed, when determining a timing sequence of the downlink HARQ feedback on a last radio frame before the reconfiguration time point, the frame structure used before and after the reconfiguration time point needs to be considered. Obviously, in the technical solution of the present disclosure, in a case that the reconfiguration of the frame structure in the unlicensed frequency band is or is not required, the solutions of determining the uplink subframe for implementing the downlink HARQ feedback corresponds to the downlink subframes are provided respectively. The technical solution of the present disclosure provides the perfect downlink HARQ feedback method in the unlicensed frequency band to ensure a stable and orderly transmission of downlink data for a scene of working with a dynamic frame structure.

In the above technical solution, optionally, the first determination unit is specifically configured to: determine the uplink subframe for implementing the downlink HARQ feedback corresponds to each downlink subframe according to the timing sequence of the downlink HARQ feedback corresponds to the currently used frame structure.

In the technical solution, in view of a plurality of types of frame structure provided in the present disclosure, different timing sequence of the downlink HARQ feedback can be defined respectively. Therefore, when it is not necessary to reconfigure the frame structure, the uplink subframe for implementing the downlink HARQ feedback corresponds to each downlink subframe can be determined according to the timing sequence of the downlink HARQ feedback corresponds to the currently used frame structure.

In any of the above technical solutions, optionally, the second determination unit is specifically configured to: determine the uplink subframe for implementing the downlink HARQ feedback corresponds to each downlink subframe in the last radio frame before the reconfiguration time point, according to the number of the uplink subframes in the first frame structure and in the second frame structure.

In the technical solution, when it is necessary to reconfigure, the frame structure used before and after the reconfiguration time point may be changed, that is, the number of downlink and uplink subframes in the frame structure may be changed, therefore, to ensure stability and order of the timing sequence of the downlink HARQ feedback, and to avoid a problem of conflicts of the timing sequence of the downlink HARQ feedback, the uplink subframe for implementing the downlink HARQ feedback corresponds to each downlink subframe in the last radio frame before the reconfiguration time point is needed to be determined, according to the number of the uplink subframe used in the frame structure before and after the reconfiguration time point.

In the above technical solution, optionally, the second determination unit is specifically further configured to: determine the uplink subframe for implementing the downlink HARQ feedback corresponds to each downlink subframe in the last radio frame before the reconfiguration time point, according to the timing sequence of the downlink HARQ feedback corresponds to the first frame structure, when the number of the uplink subframe in the first frame structure is less than or equal to the number of the uplink subframe in the second frame structure.

Determine the uplink subframe for implementing the downlink HARQ feedback corresponds to each downlink subframe in the last radio frame before the reconfiguration time point, according to the timing sequence of the downlink HARQ feedback corresponds to the second frame structure, when the number of the uplink subframe in the first frame structure is more than the number of the uplink subframe in the second frame structure.

In the technical solution, when the number of the uplink subframe used in the first frame structure is less than or equal to the number of the uplink subframe to be used in the second frame structure before the reconfiguration time point, the timing sequence of the downlink HARQ feedback of the last radio frame before the reconfiguration time point can still use the downlink HARQ feedback corresponds to the first frame structure, so as to ensure that each downlink subframe has a corresponding uplink subframe for implementing the downlink HARQ feedback in the last radio frame before the reconfiguration time point. When the number of the uplink subframe used in the first frame structure is more than the number of the uplink subframe to be used in the second frame structure before the reconfiguration time point, to ensure that each downlink subframe has the corresponding uplink subframes for implementing the downlink HARQ feedback in the last radio frame before the reconfiguration time point, the uplink subframes for implementing the downlink HARQ feedback in the last radio frame before the reconfiguration time point can be determined according to the timing sequence of the downlink HARQ feedback corresponds to the second frame structure used after the reconfiguration time point.

In any of the above technical solutions, optionally, subframe interval between each downlink subframe and the corresponding uplink subframe for implementing the downlink HARQ feedback is more than or equal to 3.

In the technical solution, as information transmission time and calculation processing time of the terminal together need at least 3 ms, the subframe interval between each downlink subframe and the corresponding uplink subframe for implementing the downlink HARQ feedback is more than or equal to 3. For example, a subframe n is a downlink subframe, a closest uplink subframe for implementing the downlink HARQ feedback corresponds to the subframe n should be n+4 (3 subframes are separated from the subframe n).

In any of the above technical solutions, optionally, when frame structure used in the unlicensed frequency band includes a plurality of uplink subframes, a number of downlink HARQ feedback messages sent on the plurality of uplink subframes is equalized.

In the technical solution, by equalizing the number of downlink HARQ feedback messages sent on the plurality of uplink subframes, a problem of excessive HARQ signaling overhead on a certain uplink subframe can be avoided.

According to a third aspect of the present disclosure, a terminal is further provided, which includes: a downlink HARQ feedback device in an unlicensed frequency band based on dynamic frame structure according to any one of the above technical solutions.

BRIEF DESCRIPTION OF THE DRAWINGS

FIG. 10 shows a schematic structural diagram of a terminal according to the embodiment of the present disclosure;

DETAILED DESCRIPTION

Figure 1:
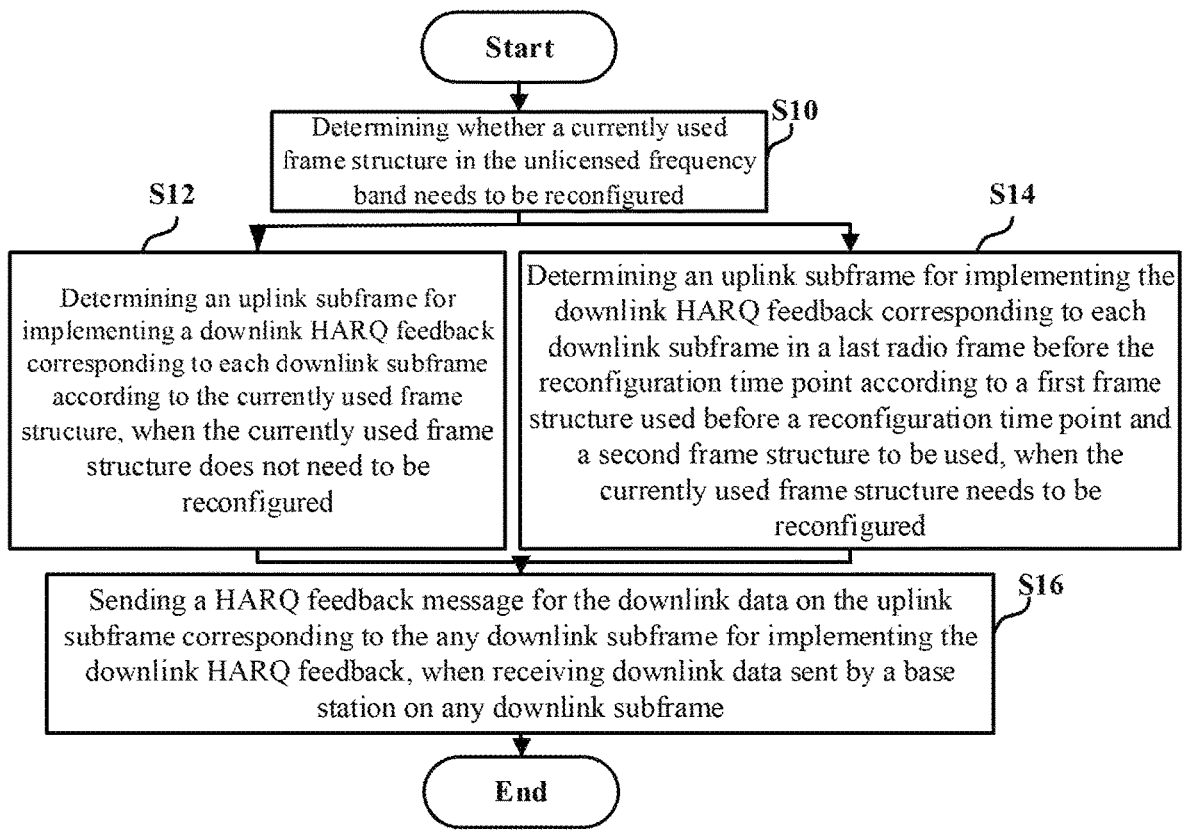
FIG. 1 shows a schematic flowchart diagram of a downlink Hybrid Automatic Repeat Request (HARQ) feedback method according to an embodiment of the present disclosure.

In order to more clearly understand above objects, features and advantages of the present disclosure, a further detailed description of the present disclosure is given below with reference to the accompanying drawings and the specific implementation modes. It should be noted that under the condition that no conflict exists, the embodiments of the present disclosure and the features in the embodiments can be combined with each other.

Many specific details are set forth in the following description to facilitate full understanding of the present disclosure, however, the present disclosure may also be implemented in other ways other than those described herein, the protection scope of the present disclosure is not limited by the specific embodiments disclosed below.

In a technical solution of the present disclosure, a dynamic frame structure adopted in an unlicensed frequency band is first provided. Specifically, a period of dynamic change of a subframe can be dynamic, such as 10 ms, 40 ms, etc. The frame structure mainly meets the following requirements.

1. In order to ensure full utilization of time-frequency resources, there is no special subframe on a new frame structure when converting from downlink to uplink.

2. Since a mechanism of Listening Before Talk (LBT) exists in the unlicensed frequency band, that is, a channel detection needs to be performed before channel resources is used. In one case, channel occupation is ended when a subframe with a opposite transmission direction is encountered while occupying a channel. Therefore, uplink subframes and downlink subframes in the new frame structure are consecutively generated to ensure that channel occupation time can be maximized each time after occupying channel resources, thus uplink and downlink instantaneous throughput can be maximized.

3. Since each uplink subframe "U" requires corresponding scheduling signaling sent by a base station to determine information of a corresponding code modulation mode etc., and ACK/NACK feedback messages correspond to uplink data need to be sent on the downlink subframe, a frame structure of all uplink subframes is undesirable. ACK/NACK feedback messages correspond to downlink data need to be sent on the uplink subframe, thus, a frame structure of all downlink subframes is also undesirable.

Based on above requirements, the frame structure provided in the present disclosure specifically includes the following types: UDDDDDDDDD, UUDDDDDDDD, UUUDDDDDDD, UUUUDDDDDD, UUUUUDDDDD, UUUUUUDDDD, UUUUUUUDDD, UUUUUUUUDD, UUUUUUUUUD.

As it is a downlink HARQ feedback method based on the dynamic frame structure, it can be necessary to reconfigure a subsequent used frame structure when a subframe reconfiguration cycle comes, that is to determine the subsequent used frame structure according to a changed proportion of uplink and downlink services volume. In the technical solution of the present disclosure, time when the reconfiguration cycle comes is called a reconfiguration time point, and configuration of subframes on a non-reconfigurable time point does not change.

Based on the above frame structures, the downlink HARQ feedback method based on the dynamic frame structure in the unlicensed frequency band provided in the present disclosure is shown in FIG. 1, the method includes:

Step 10, determining whether a currently used frame structure in the unlicensed frequency band needs to be reconfigured.

Step 12, when the currently used frame structure does not need to be reconfigured, determining an uplink subframe for implementing a downlink HARQ feedback correspond to each downlink subframe according to the currently used frame structure.

In one embodiment of the present disclosure, the step 12 specifically includes: determining the uplink subframe for implementing the downlink HARQ feedback corresponds to each downlink subframe according to the timing sequence of the downlink HARQ feedback corresponds to the currently used frame structure. When it is not necessary to reconfigure the frame structure, the uplink subframe for implementing the downlink HARQ feedback corresponds to each downlink subframe can be determined according to the timing sequence of the downlink HARQ feedback corresponds to the currently used frame structure.

Step 14, when the currently used frame structure needs to be reconfigured, according to a first frame structure used before a reconfiguration time point and a second frame structure to be used, determining an uplink subframe for implementing the downlink HARQ feedback corresponds to each downlink subframe in a last radio frame before the reconfiguration time point.

In one embodiment of the present disclosure, the step 14 specifically includes: determining the uplink subframe for implementing the downlink HARQ feedback corresponds to each downlink subframe in the last radio frame before the reconfiguration time point, according to the number of the uplink subframes in the first frame structure and in the second frame structure.

Specifically, when the number of the uplink subframe in the first frame structure is less than or equal to the number of the uplink subframe in the second frame structure, determining the uplink subframe for implementing the downlink HARQ feedback corresponds to each downlink subframe in the last radio frame before the reconfiguration time point, according to the timing sequence of the downlink HARQ feedback corresponds to the first frame structure. When the number of the uplink subframe in the first frame structure is more than the number of the uplink subframe in the second frame structure, determining the uplink subframe for implementing the downlink HARQ feedback corresponds to each downlink subframe in the last radio frame before the reconfiguration time point, according to the timing sequence of the downlink HARQ feedback corresponds to the second frame structure.

For interval between each downlink subframe and the corresponding uplink subframe for implementing the downlink HARQ feedback, the present disclosure requires that subframe interval between each downlink subframe and the corresponding uplink subframe for implementing the downlink HARQ feedback is more than or equal to 3.

Specifically, as information transmission time and calculation processing time of the terminal together need at least 3 ms, the subframe interval between each downlink subframe and the corresponding uplink subframe for implementing the downlink HARQ feedback is more than or equal to 3. For example, a subframe n is a downlink subframe, a closest uplink subframe for implementing the downlink HARQ feedback corresponds to the subframe n should be n+4 (namely there are 3 subframes between the closest uplink subframe and the subframe n).

In addition, in order to avoid a problem of excessive HARQ signaling overhead on a certain uplink subframe, when frame structure used in the unlicensed frequency band includes a plurality of uplink subframes, a number of downlink HARQ feedback messages sent on the plurality of uplink subframes is equalized.

The downlink HARQ feedback method based on the dynamic frame structure in the unlicensed frequency band shown in FIG. 1 further includes:

Step 16, when receiving downlink data sent by a base station on any downlink subframe, sending a HARQ feedback message for the downlink data on the uplink subframe corresponds to the any downlink subframe for implementing the downlink HARQ feedback.

Obviously, in the technical solution of the present disclosure, in a case that the reconfiguration of the frame structure in the unlicensed frequency band is or is not required, the solutions of determining the uplink subframe for implementing the downlink HARQ feedback corresponds to the downlink subframes are provided respectively. The technical solution of the present disclosure provides the perfect downlink HARQ feedback method in the unlicensed frequency band to ensure a stable and orderly transmission of downlink data for a scene of working with a dynamic frame structure.

The solution shown in FIG. 1 is described in detail below with specific subframe configurations:

Nine frame structures provided in the present disclosure are respectively includes:

Configuration 0: UDDDDDDDDD; Configuration 1: UUDDDDDDDD; Configuration 2: UUUDDDDDDD; Configuration 3: UUUUDDDDDD; Configuration 4: UUUUUDDDDD; Configuration 5: UUUUUUDDDD; Configuration 6: UUUUUUUDDD; Configuration 7: UUUUUUUUDD; Configuration 8: UUUUUUUUUD. The following is a description of non-reconfigurable time point and reconfiguration time point respectively:

First, a non-reconfigurable time point

Figure 2:
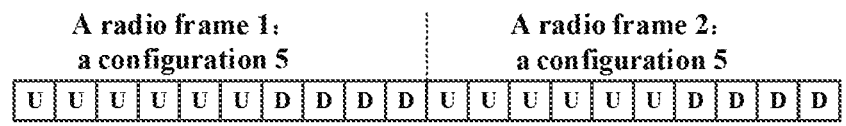
FIG. 2 shows a schematic diagram of a radio frame on a non-reconfigurable time point according to the embodiment of the present disclosure.

On a non-reconfigurable time point, the subframe configurations are unchanged. As shown in FIG. 2: since it is the non-reconfigurable time point, both a radio frame 1 and a radio frame 2 adopt the same frame structure configuration, such as configuration 5 is used.

For the above nine frame structures, the present disclosure provides a timing sequence of the downlink HARQ feedback for the nine frame structures respectively, and the timing sequence of the downlink HARQ feedback satisfies the following conditions:

1. As information transmission time and calculation processing time of the terminal need at least 3 ms, the subframe interval between a downlink subframe sending downlink data and a corresponding uplink subframe for implementing the downlink HARQ feedback (that is a ACK/NACK feedback message) is at least 3 subframes.

2. In a frame structure having more than one uplink subframes, the downlink HARQ feedback for the downlink data should be equally distributed among the uplink subframes to avoid excessive downlink HARQ feedback signaling overhead on a certain uplink subframe.

On the basis of above conditions, the present disclosure provides an optimal timing sequence of the downlink HARQ feedback, as shown in table 3.

TABLE 3

| Configuration number | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 9 | 8 | 7 | 6 | 5 | 4 | 13 | 12 | 11 |
| 1 | | | 8 | 7 | 6 | 6 | 5 | 4 | 12 | 11 |
| 2 | | | | 7 | 6 | 6 | 5 | 5 | 4 | 11 |
| 3 | | | | | 6 | 5 | 5 | 5 | 4 | 4 |
| 4 | | | | | | 5 | 5 | 5 | 5 | 5 |
| 5 | | | | | | | 4 | 4 | 4 | 4 |
| 6 | | | | | | | | 4 | 4 | 4 |
| 7 | | | | | | | | | 4 | 4 |
| 8 | | | | | | | | | | 4 |

As shown in table 3, a number k in the table represents that: when the downlink data is transmitted on a subframe n, its corresponding ACK/NACK information will be fed back on a subframe n+k. When n+k>9, the ACK/NACK information (% is a remainder symbol) is fed back on the subframe with subframe number (n+k) %10 of a first radio frame after a current radio frame. When n+k>19, ACK/NACK information is fed back on an uplink subframe with subframe number (n+k) %10 of a second radio frame after the current radio frame.

Figure 3:
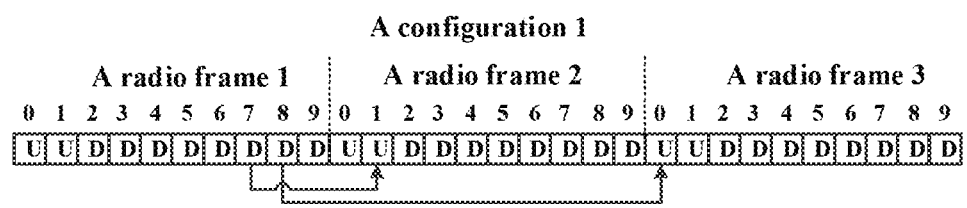
FIG. 3 shows a schematic diagram of a timing sequence of the downlink HARQ feedback on the non-reconfigurable time point according to the embodiment of the present disclosure.

Specifically, as shown in FIG. 3, taking the configuration 1 as an example, according to the timing sequence of the downlink HARQ feedback shown in table 3, the ACK/NACK feedback messages correspond to the downlink data sent by a subframe 7 in the radio frame 1 is fed back on a subframe 1 in the radio frame 2. According to the timing sequence of the downlink HARQ feedback shown in table 3, the ACK/NACK feedback messages correspond to the downlink data sent by a subframe 8 in the radio frame 1 is fed back on a subframe 0 in a radio frame 3.

Second, a reconfiguration time point

Figure 4:
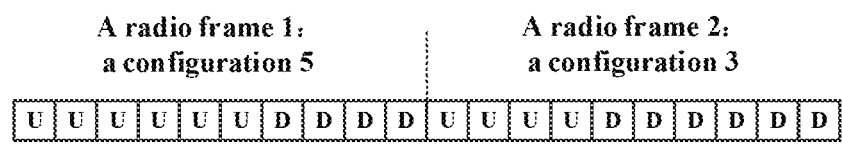
FIG. 4 shows a schematic diagram of a radio frame on a reconfiguration time point according to the embodiment of the present disclosure.

On a reconfiguration time point, the subframe configurations change. As shown in FIG. 4: the radio frame 1 before the reconfiguration time point adopts the configuration 5, the radio frame 2 after the reconfiguration time point adopts the configuration 3. A last radio frame before the reconfiguration time point is called a boundary frame below.

Figure 5:
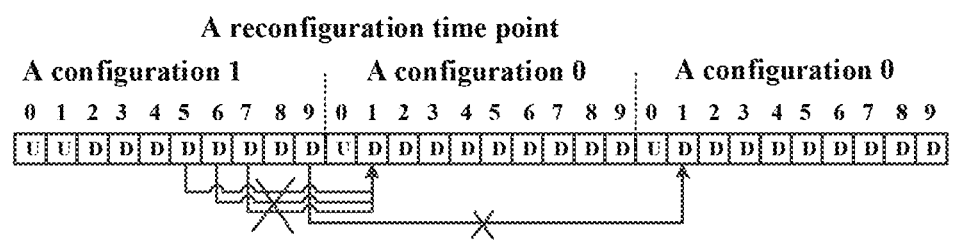
FIG. 5 shows a schematic diagram of conflicts of the downlink HARQ feedback on the reconfiguration time point.

After the reconfiguration cycle, HARQ timing sequences of the radio frame before and after the reconfiguration time point are different (unless the subframe configuration after the reconfiguration time point and before the reconfiguration time point are the same). Conflicts of the HARQ timing sequence may occur during transition between two subframe configurations. Specifically as shown in FIG. 5, a subframe structure in the unlicensed frequency band is converted from the configuration 1 to the configuration 0. According to the timing sequence of the downlink HARQ feedback shown in table 3, the ACK/NACK feedback messages correspond to downlink data sent by 5, 6, and 7 downlink subframes of the boundary frames should be sent on the subframe 1 of the first radio frame after the reconfiguration time point. The subframe 1 of the first radio frame after the reconfiguration time point is the downlink subframe, which lacks corresponding uplink resources, the feedback messages cannot be sent, and conflicts of the timing sequence is caused. By the same token, the ACK/NACK feedback messages correspond to downlink data sent by a 9 downlink subframes of the boundary frames should be sent on the subframe 1 of the second radio frame after the reconfiguration time point. The subframe 1 of the second radio frame after the reconfiguration time point is the downlink subframe, which cannot feedback the ACK/NACK messages, thus a problem of conflicts of the timing sequence of the downlink HARQ feedback is caused.

Figure 6:
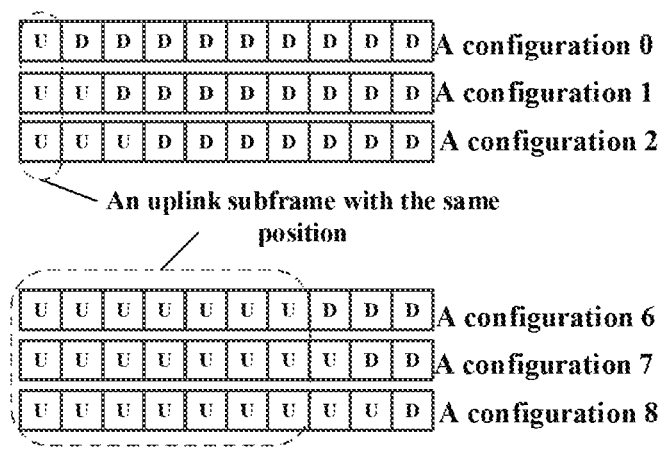
FIG. 6 shows a schematic diagram of subframe contrast relationships in frame structures provided in the embodiment of the present disclosure.

At the same time, from a perspective of frame structure configuration, a number of the uplink subframes from the configuration 0 to the configuration 8 in the above frame structure increases in turn, and positions of other uplink subframes are consistent except for extra uplink subframes, as shown in FIG. 6. Therefore, when the configuration with fewer uplink subframes is reconfigured to the configuration with more uplink subframes, the timing sequence of the downlink HARQ feedback on the boundary frame is not affected. When the configuration with more uplink subframes is reconfigured to the configuration with fewer uplink subframes, the timing sequence of the downlink HARQ feedback on the boundary frame may be conflicted.

Figure 7:
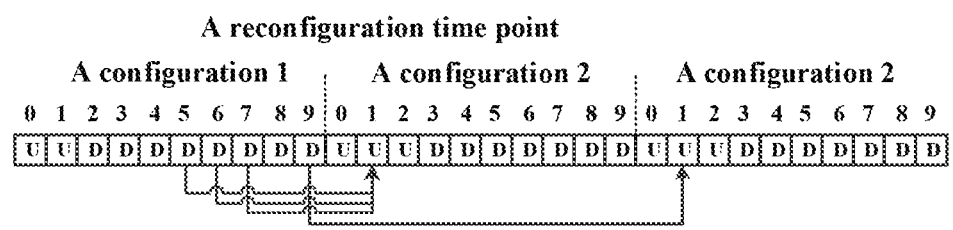
FIG. 7 shows a schematic diagram of a timing sequence of the downlink HARQ feedback on a boundary frame when converting from a fewer subframe structure to a more subframe structure of the uplink subframes according to the embodiment of the present disclosure.

Therefore, a solution provided by the present disclosure is that:

1. When the number of the uplink subframes in the frame structure after the reconfiguration time point is more than or equal to the number of the uplink subframes in the frame structure before the reconfiguration time point, the timing sequence of the downlink HARQ on the boundary frame is not changed. As shown in FIG. 7, the subframe structure in the unlicensed frequency band is converted from the configuration 1 to the configuration 2. Since the number of the uplink subframes in the configuration 2 is more than the number of the uplink subframes in the configuration 1, the timing sequence of the downlink HARQ feedback on the boundary frame is not changed (taking the timing sequence of the downlink HARQ feedback shown in table 3 as an example).

Figure 8:
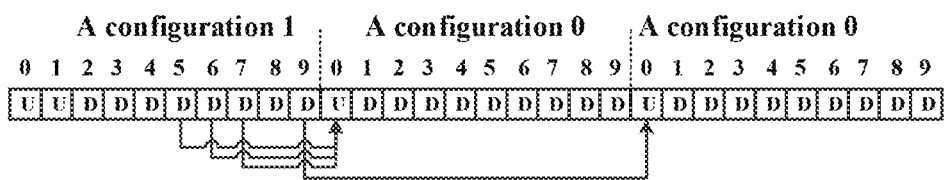
FIG. 8 shows a schematic diagram of a timing sequence of the downlink HARQ feedback on a boundary frame when converting from the more subframe structure to the fewer subframe structure of the uplink subframes according to the embodiment of the present disclosure.

2. When the number of the uplink subframes in the frame structure after the reconfiguration time point is less than the number of the uplink subframes in the frame structure before the reconfiguration time point, the timing sequence of the downlink HARQ on the boundary frame uses the timing sequence of the downlink HARQ corresponds to the frame structure after the reconfiguration time point. As shown in FIG. 8, the subframe structure in the unlicensed frequency band is converted from the configuration 1 to the configuration 0. Since the number of the uplink subframes in the configuration 0 is less than the number of the uplink subframes in the configuration 1, the timing sequence of the downlink HARQ feedback on the boundary frame uses the HARQ timing sequence corresponds to the configuration 0 (taking the timing sequence of the downlink HARQ feedback shown in table 3 as an example).

Figure 9:
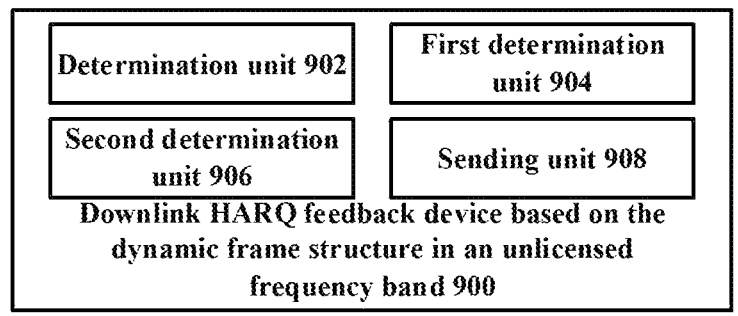
FIG. 9 shows a schematic block diagram of a downlink HARQ feedback device according to the embodiment of the present disclosure.

Based on the dynamic frame structure provided above by the present disclosure, a downlink HARQ feedback device based on the dynamic frame structure in the unlicensed frequency band is provided in the present disclosure, as shown in FIG. 9, a downlink HARQ feedback device 900 includes: a determination unit 902, a first determination unit 904, a second determination unit 906 and a sending unit 908.

The determination unit 902 configured to determine whether a currently used frame structure in the unlicensed frequency band needs to be reconfigured; the first determination unit 904 configured to determine an uplink subframe for implementing a downlink HARQ feedback corresponds to each downlink subframe according to the currently used frame structure, when the determination unit 902 determines that an uplink subframe does not need to be reconfigured; the second determination unit 904 configured to determine an uplink subframe for implementing the downlink HARQ feedback corresponds to each downlink subframe in a last radio frame before a reconfiguration time point, according to a first frame structure used before the reconfiguration time point and a second frame structure to be used, when the determination unit 902 determines that the uplink subframe needs to be reconfigured; the sending unit 908 configured to send a HARQ feedback message for the downlink data on the uplink subframe corresponds to the any downlink subframe for implementing the downlink HARQ feedback, when receiving downlink data sent by a base station on any downlink subframe.

In the technical solution, because each frame structure adopted in the unlicensed frequency band includes the uplink subframes and the downlink subframes, a special subframe converted from the downlink to the uplink is discarded, thus time-frequency resources can be fully utilized. Due to a channel detection is required when working in the unlicensed frequency band, therefore, by setting subframe continuity of the same type included in each frame structure, that is, by setting continuities of the uplink subframes and the downlink subframes in each frame structure respectively, channel occupation time can be maximized after occupying channel resources each time, thus instantaneous throughput can be maximized.

As the present disclosure adopts dynamic frame structure in the unlicensed frequency band, that is, when it is not necessary to reconfigure the frame structure, the uplink subframe for implementing the downlink HARQ feedback corresponds to each downlink subframe is directly determined according to a current frame structure. When it is necessary to reconfigure the frame structure, as the frame structure used before and after a reconfiguration time point may be changed, when determining a timing sequence of the downlink HARQ feedback on a last radio frame before the reconfiguration time point, the frame structure used before and after the reconfiguration time point needs to be considered. Obviously, in the technical solution of the present disclosure, in a case that the reconfiguration of the frame structure in the unlicensed frequency band is or is not required, the solutions of determining the uplink subframe for implementing the downlink HARQ feedback corresponds to the downlink subframes are provided respectively. The technical solution of the present disclosure provides the perfect downlink HARQ feedback method in the unlicensed frequency band to ensure a stable and orderly transmission of downlink data for a scene of working with a dynamic frame structure.

In the above technical solution, optionally, the first determination unit 904 is specifically configured to: determine the uplink subframe for implementing the downlink HARQ feedback corresponds to each downlink subframe according to the timing sequence of the downlink HARQ feedback corresponds to the currently used frame structure.

In the technical solution, in view of a plurality of types of frame structure provided in the present disclosure, different timing sequence of the downlink HARQ feedback can be defined respectively. Therefore, when it is not necessary to reconfigure the frame structure, the uplink subframe for implementing the downlink HARQ feedback corresponds to each downlink subframe can be determined according to the timing sequence of the downlink HARQ feedback corresponds to the currently used frame structure.

In any of the above technical solutions, optionally, the second determination unit 906 is specifically configured to: determine the uplink subframe for implementing the downlink HARQ feedback corresponds to each downlink subframe in the last radio frame before the reconfiguration time point, according to the number of the uplink subframes in the first frame structure and in the second frame structure.

In the technical solution, when it is necessary to reconfigure, the frame structure used before and after the reconfiguration time point may be changed, that is, the number of the downlink subframe and the uplink subframe in the frame structure may be changed, therefore, to ensure stability and order of the timing sequence of the downlink HARQ feedback, and to avoid a problem of conflicts of the timing sequence of the downlink HARQ feedback, the uplink subframe for implementing the downlink HARQ feedback corresponds to each downlink subframe in the last radio frame before the reconfiguration time point is needed to determine, according to the number of the uplink subframe used in the frame structure before and after the reconfiguration time point.

In the above technical solution, optionally, the second determination unit 906 is specifically further configured to:

determine the uplink subframe for implementing the downlink HARQ feedback corresponds to each downlink subframe in the last radio frame before the reconfiguration time point, according to the timing sequence of the downlink HARQ feedback corresponds to the first frame structure, when the number of the uplink subframe in the first frame structure is less than or equal to the number of the uplink subframe in the second frame structure.

Determine the uplink subframe for implementing the downlink HARQ feedback corresponds to each downlink subframe in the last radio frame before the reconfiguration time point, according to the timing sequence of the downlink HARQ feedback corresponds to the second frame structure, when the number of the uplink subframe in the first frame structure is more than the number of the uplink subframe in the second frame structure.

In the technical solution, when the number of the uplink subframe used in the first frame structure is less than or equal to the number of the uplink subframe to be used in the second frame structure before the reconfiguration time point, the timing sequence of the downlink HARQ feedback of the last radio frame before the reconfiguration time point can still use the downlink HARQ feedback corresponds to the first frame structure, so as to ensure that each downlink subframe has a corresponding uplink subframe for implementing the downlink HARQ feedback in the last radio frame before the reconfiguration time point. When the number of the uplink subframe used in the first frame structure is more than the number of the uplink subframe to be used in the second frame structure before the reconfiguration time point, to ensure that each downlink subframe has the corresponding uplink subframes for implementing the downlink HARQ feedback in the last radio frame before the reconfiguration time point, the uplink subframes for implementing the downlink HARQ feedback in the last radio frame before the reconfiguration time point can be determined according to the timing sequence of the downlink HARQ feedback corresponds to the second frame structure used after the reconfiguration time point.

In any of the above technical solutions, optionally, subframe interval between each downlink subframe and the corresponding uplink subframe for implementing the downlink HARQ feedback is more than or equal to 3.

In the technical solution, as information transmission time and calculation processing time of the terminal need at least 3 ms, the subframe interval between each downlink subframe and the corresponding uplink subframe for implementing the downlink HARQ feedback is more than or equal to 3. For example, a subframe n is a downlink subframe, a closest uplink subframe for implementing the downlink HARQ feedback corresponds to the subframe n should be n+4 (3 subframes are separated from the subframe n).

In any of the above technical solutions, optionally, when frame structure used in the unlicensed frequency band includes a plurality of uplink subframes, a number of downlink HARQ feedback messages sent on the plurality of uplink subframes is equalized.

In the technical solution, by equalizing the number of downlink HARQ feedback messages sent on the plurality of uplink subframes, a problem of excessive HARQ signaling overhead on a certain uplink subframe can be avoided.

FIG. 10 shows a schematic structural diagram of a terminal according to the embodiment of the present disclosure.

As shown in FIG. 10, a terminal 1000 according to the embodiment of the present disclosure, which includes: a downlink HARQ feedback device 900 based on the dynamic frame structure in the unlicensed frequency band as shown in FIG. 9.

Figure 11:
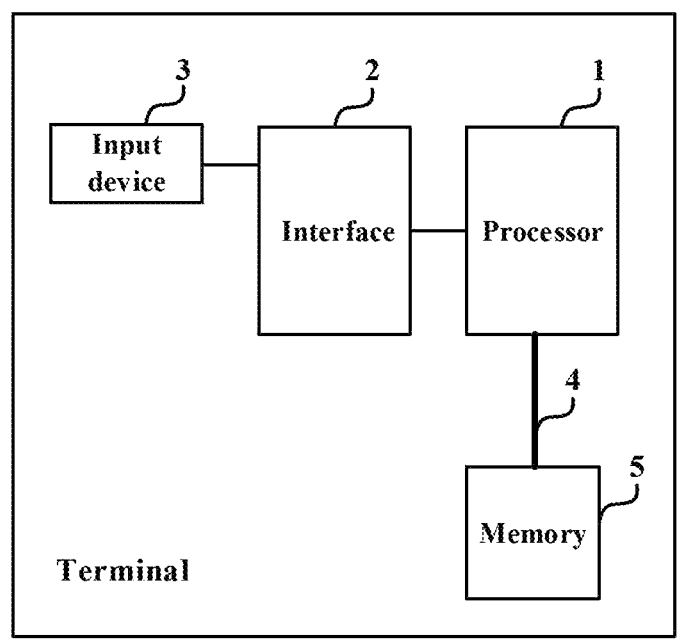
FIG. 11 shows a schematic structural diagram of a terminal according to another embodiment of the present disclosure.

FIG. 11 shows a schematic structural diagram of a terminal according to another embodiment of the present disclosure.

As shown in FIG. 11, according to the embodiment of the present disclosure, another terminal which includes: a processor 1 and an input device 3. The input device 3 is connected to the processor 1 through an interface 2, and a memory 5 is connected to the processor 1 through a bus 4. The memory 5 is used to store a group of program codes, the processor 1 is used to invoke program codes stored in the memory 5, and the processor 1 is used to execute the following operations:

Determining whether a currently used frame structure in the unlicensed frequency band needs to be reconfigured through the input device 3;

When the currently used frame structure does not need to be reconfigured, determining an uplink subframe for implementing a downlink HARQ feedback corresponds to each downlink subframe according to the currently used frame structure.

When the currently used frame structure needs to be reconfigured, according to a first frame structure used before a reconfiguration time point and a second frame structure to be used, determining an uplink subframe for implementing the downlink HARQ feedback corresponds to each downlink subframe in a last radio frame before the reconfiguration time point.

When the input device 3 receives downlink data sent by a base station on any downlink subframe, sending a HARQ feedback message for the downlink data on the uplink subframe corresponds to the any downlink subframe for implementing the downlink HARQ feedback.

As an optional embodiment, the processor 1 calls the program code stored in the memory 5 to execute an operation for determining an uplink subframe for implementing a downlink HARQ feedback corresponds to each downlink subframe according to the currently used frame structure, which specifically includes:

Determining the uplink subframe for implementing the downlink HARQ feedback corresponds to each downlink subframe according to the timing sequence of the downlink HARQ feedback corresponds to the currently used frame structure.

As an optional embodiment, the processor 1 calls the program code stored in the memory 5 to execute an operation for determining an uplink subframe for implementing the downlink HARQ feedback corresponds to each downlink subframe in a last radio frame before the reconfiguration time point, according to a first frame structure used before a reconfiguration time point and a second frame structure to be used, which specifically includes:

Determining the uplink subframe for implementing the downlink HARQ feedback corresponds to each downlink subframe in the last radio frame before the reconfiguration time point, according to the number of the uplink subframes in the first frame structure and in the second frame structure.

As an optional embodiment, the processor 1 calls the program code stored in the memory 5 to further execute following operations:

When the number of the uplink subframe in the first frame structure is less than or equal to the number of the uplink subframe in the second frame structure, determining the uplink subframe for implementing the downlink HARQ feedback corresponds to each downlink subframe in the last radio frame before the reconfiguration time point, according to the timing sequence of the downlink HARQ feedback corresponds to the first frame structure.

As an optional embodiment, the processor 1 calls the program code stored in the memory 5 to further execute following operations:

When the number of the uplink subframe in the first frame structure is more than the number of the uplink subframe in the second frame structure, determining the uplink subframe for implementing the downlink HARQ feedback corresponds to each downlink subframe in the last radio frame before the reconfiguration time point, according to the timing sequence of the downlink HARQ feedback corresponds to the second frame structure.

The method disclosed by the embodiment of the present disclosure can be used for sequentially adjusting, merging and deleting according to actual needs.

The units in the terminal in the embodiment of the present disclosure can be merged, divided and deleted according to actual needs.

Persons of ordinary skill in the art can understand that all or part of the steps of the various methods of the embodiments can be completed by instructing relevant hardware through a program, the program can be stored in a computer readable storage medium, the storage medium includes a Read-Only Memory (ROM), a Random Access Memory (RAM), a Programmable Read-only Memory (PROM), an Erasable Programmable Read Only Memory (EPROM), an One-time Programmable Read-Only Memory (OTPROM), an Electrically-Erasable Programmable Read-Only Memory (EEPROM), a Compact Disc Read-Only Memory (CD-ROM), or other optical disk storage, a magnetic disk storage, a magnetic tape storage, or any other medium which can be read by a computer that can be used for carrying or storing data.

The technical solution of the present disclosure is described in detail with reference to accompanying drawings. The present disclosure provides a new downlink HARQ feedback method based on a dynamic frame structure in an unlicensed frequency band. For a scene of working with a dynamic frame structure, a perfect downlink HARQ feedback method in the unlicensed frequency band is provided, thus effectively makes up for the lack of the timing sequence of the downlink HARQ feedback when using the dynamic subframe configuration in the unlicensed frequency band, and ensures a stable and orderly transmission of downlink data, thus ensuring efficient use of time-frequency resources and improving performance of a system.

The above mentioned descriptions are merely preferred embodiments of the present disclosure, and are not to limit the present disclosure. For persons skilled in the art, various changes or modifications may be made to the present disclosure. Any modification, equivalent, and improvement without departing from the spirit and scope of the present disclosure, should be within the protection scope of the present disclosure.

We claim:

1. A downlink Hybrid Automatic Repeat Request (HARQ) feedback method in an unlicensed frequency band based on dynamic frame structure, each frame structure adopted in the unlicensed frequency band merely comprising uplink subframes and downlink subframes, and each frame structure having a same type of a subframe continuity setting, the frame structures comprising: UDDDDDDDDD, UUDDDDDDDD, UDDDDDDDDD, UUUUDDDDDD, UUUUUDDDDD, UUUUUUDDDD, UUUUUUDDD, UUUUUUUUDD, UUUUUUUUUD, wherein D represents a downlink channel sub-frame, and U represents an uplink channel sub-frame, the downlink HARQ feedback method comprising:
   determining whether a currently used frame structure in the unlicensed frequency band needs to be reconfigured;
   determining an uplink subframe for implementing a downlink HARQ feedback corresponding to each downlink subframe according to the currently used frame structure, when the currently used frame structure does not need to be reconfigured;
   determining the uplink subframe for implementing the downlink HARQ feedback corresponding to each downlink subframe in the last radio frame before the reconfiguration time point, according to a number of the uplink subframes in the first frame structure used before the reconfiguration time point and in the second frame structure to be used, when the currently used frame structure needs to be reconfigured, wherein a subframe interval between each downlink subframe and a corresponding uplink subframe for implementing the downlink HARQ feedback is more than or equal to 3; and
   sending a HARQ feedback message for the downlink data on the uplink subframe corresponding to the any downlink subframe for implementing the downlink HARQ feedback, when receiving downlink data sent by a base station on any downlink subframe.

2. The downlink HARQ feedback method in the unlicensed frequency band based on dynamic frame structure of claim 1, further comprising:
   when the number of the uplink subframe in the first frame structure is less than or equal to the number of the uplink subframe in the second frame structure, determining the uplink subframe for implementing the downlink HARQ feedback corresponding to each downlink subframe in the last radio frame before the reconfiguration time point, according to the timing sequence of the downlink HARQ feedback corresponding to the first frame structure;
   when frame structure used in the unlicensed frequency band includes a plurality of uplink subframes, a number of downlink HARQ feedback messages sent on the plurality of uplink subframes is equalized.

3. The downlink HARQ feedback method in the unlicensed frequency band based on dynamic frame structure of claim 2, further comprising:
   when the number of the uplink subframe in the first frame structure is more than the number of the uplink subframe in the second frame structure, determining the uplink subframe for implementing the downlink HARQ feedback corresponding to each downlink subframe in the last radio frame before the reconfiguration time point, according to the timing sequence of the downlink HARQ feedback corresponding to the second frame structure.

4. A terminal, comprising:
   at least one processor; and
   a storage device storing a plurality of instructions, which when executed by the processor, causes the at least one processor to:
   determine whether a currently used frame structure in the unlicensed frequency band needs to be reconfigured;
   determine an uplink subframe for implementing a downlink Hybrid Automatic Repeat Request (HARQ) feedback corresponding to each downlink subframe according to the currently used frame structure, when the currently used frame structure does not need to be reconfigured;

determine an uplink subframe for implementing the downlink HARQ feedback corresponding to each downlink subframe in the last radio frame before the reconfiguration time point, according to a number of the uplink subframes in the first frame structure used before the reconfiguration time point and in the second frame structure to be used, when the currently used frame structure needs to be reconfigured, wherein a subframe interval between each downlink subframe and a corresponding uplink subframe for implementing the downlink HARQ feedback is more than or equal to 3; and send a HARQ feedback message for the downlink data on the uplink subframe corresponding to the any downlink subframe for implementing the downlink HARQ feedback, when receiving downlink data sent by a base station on any downlink subframe;

each frame structure adopted in the unlicensed frequency band merely comprising uplink subframes and downlink subframes, and each frame structure having a same type of a subframe continuity setting, the frame structures comprising: UDDDDDDDDD, UUDDDDDDDD, UUUDDDDDDD, UUUUDDDDDD, UUUUUDDDDD, UUUUUUDDDD, UUUUUUUDDD, UUUUUUUUDD, UUUUUUUUUD, wherein D represents a downlink channel sub-frame, and U represents an uplink channel sub-frame.

5. The terminal of claim 4, wherein the at least one processor further:

when the number of the uplink subframe in the first frame structure is less than or equal to the number of the uplink subframe in the second frame structure, determines the uplink subframe for implementing the downlink HARQ feedback corresponding to each downlink subframe in the last radio frame before the reconfiguration time point, according to the timing sequence of the downlink HARQ feedback corresponding to the first frame structure;

when frame structure used in the unlicensed frequency band includes a plurality of uplink subframes, a number of downlink HARQ feedback messages sent on the plurality of uplink subframes is equalized.

6. The terminal of claim 5, wherein the at least one processor further:

when the number of the uplink subframe in the first frame structure is more than the number of the uplink subframe in the second frame structure, determines the uplink subframe for implementing the downlink HARQ feedback corresponding to each downlink subframe in the last radio frame before the reconfiguration time point, according to the timing sequence of the downlink HARQ feedback corresponding to the second frame structure.

7. A non-transitory storage medium having stored thereon instructions that, when executed by a processor of a terminal, causes the processor of the terminal to perform a downlink Hybrid Automatic Repeat Request (HARQ) feedback method in an unlicensed frequency band based on dynamic frame structure, each frame structure adopted in the unlicensed frequency band merely comprising uplink subframes and downlink subframes, and each frame structure having a same type of a subframe continuity setting, the frame structures comprising: UDDDDDDDDD, UUDDDDDDDD, UUUDDDDDDD, UUUUDDDDDD, UUUUUDDDDD, UUUUUUDDDD, UUUUUUUDDD, UUUUUUUUDD, UUUUUUUUUD, wherein D represents a downlink channel sub-frame, and U represents an uplink channel sub-frame, the downlink HARQ feedback method comprising:

determining whether a currently used frame structure in the unlicensed frequency band needs to be reconfigured;

determining an uplink subframe for implementing a downlink HARQ feedback corresponding to each downlink subframe according to the currently used frame structure, when the currently used frame structure does not need to be reconfigured;

determining the uplink subframe for implementing the downlink HARQ feedback corresponding to each downlink subframe in the last radio frame before the reconfiguration time point, according to a number of the uplink subframes in the first frame structure used before the reconfiguration time point and in the second frame structure to be used, when the currently used frame structure needs to be reconfigured, wherein a subframe interval between each downlink subframe and a corresponding uplink subframe for implementing the downlink HARQ feedback is more than or equal to 3; and sending a HARQ feedback message for the downlink data on the uplink subframe corresponding to the any downlink subframe for implementing the downlink HARQ feedback, when receiving downlink data sent by a base station on any downlink subframe.

8. The non-transitory storage medium according to claim 7, further comprising:

when the number of the uplink subframe in the first frame structure is less than or equal to the number of the uplink subframe in the second frame structure, determining the uplink subframe for implementing the downlink HARQ feedback corresponding to each downlink subframe in the last radio frame before the reconfiguration time point, according to the timing sequence of the downlink HARQ feedback corresponding to the first frame structure;

when frame structure used in the unlicensed frequency band includes a plurality of uplink subframes, a number of downlink HARQ feedback messages sent on the plurality of uplink subframes is equalized.

9. The non-transitory storage medium according to claim 8, further comprising:

when the number of the uplink subframe in the first frame structure is more than the number of the uplink subframe in the second frame structure, determining the uplink subframe for implementing the downlink HARQ feedback corresponding to each downlink subframe in the last radio frame before the reconfiguration time point, according to the timing sequence of the downlink HARQ feedback corresponding to the second frame structure.

* * * * *